(No Model.)
J. M. FOSTER.
PRESSURE REGULATING VALVE AND GOVERNOR.
No. 391,786. Patented Oct. 30, 1888.
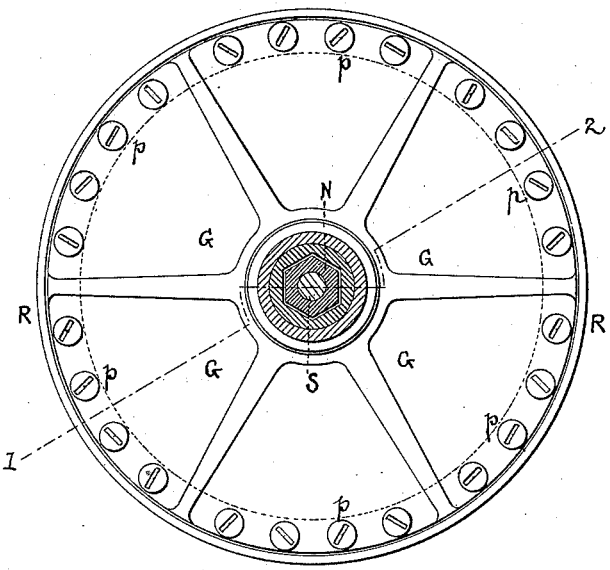
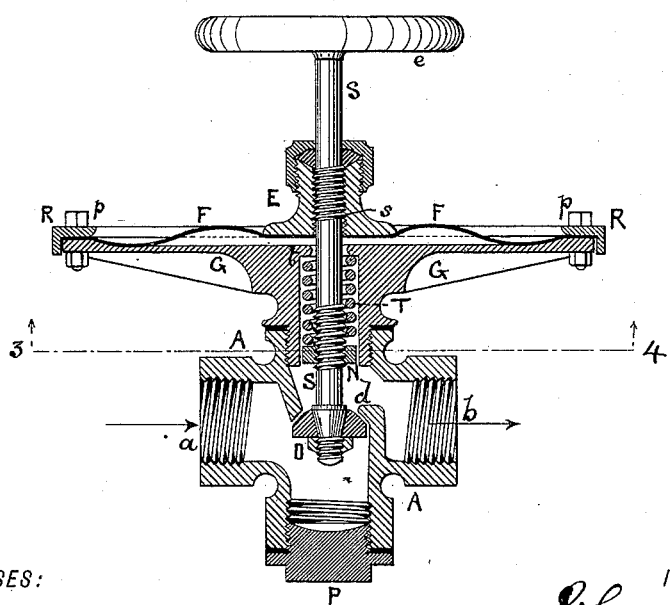
WITNESSES:
Geo. A. Crane.
John Ravell.
INVENTOR.
John M. Foster,
BY Howson and Howson,
his ATTORNEYS.

UNITED STATES PATENT OFFICE.

JOHN M. FOSTER, OF NEW YORK, N. Y.

PRESSURE-REGULATING VALVE AND GOVERNOR.

SPECIFICATION forming part of Letters Patent No. 391,786, dated October 30, 1888.

Application filed June 20, 1888. Serial No. 277,636. (No model.)

*To all whom it may concern:*

Be it known that I, JOHN M. FOSTER, a citizen of the United States, and a resident of New York city, New York, have invented an Improved Pressure-Regulating Valve and Governor, of which the following is a specification.

My invention consists of a combined pressure-regulating valve and governor which is more especially adapted for regulating steam-pressure, as in the case of heating railway cars or rooms by steam from a boiler.

The object of my invention is to provide the valve which admits, adjusts, or cuts off the pressure of fluid with regulating or governing means, whereby that pressure will be maintained constant under all variations of pressure on the boiler or supply side of the valve.

In the accompanying drawings, Figure 1 is a vertical section on the line 1 2, Fig. 2, of my improved automatic regulating valve and governor; and Fig. 2 is an inverted sectional plan view on the line 3 4, Fig. 1.

A is the valve-casing, with an inlet, $a$, and outlet $b$, and a seat, $d$, for valve D. The stem S of this valve is threaded, as usual, at $s$, and adapted to a corresponding thread in the stuffing-box E. The stem is provided on the outside with the usual operating hand-wheel or other handle, $e$, by manipulating which the valve D may be brought to or removed from its seat $d$ to an extent commensurate with the pressure of steam or other fluid required on the distributing side of the valve.

The stuffing-box, through which the valve-stem passes, instead of being a fixed part of the valve-casing, as in the ordinary adjusting-valves, is carried by and can be moved with a flexible diaphragm, F, which is subjected to the action of the pressure of steam or other fluid on the distributing side of the valve, so that as the pressure on the diaphragm increases the valve will be moved toward its seat. In the present instance the rim of the flexible diaphragm, which may be of any suitable metal or other material, is secured by a ring, R, and bolts or screws $p$ to the rim of a dish or disk G. In Fig. 2, I have shown the ring as secured by screws from the under side, while in Fig. 1 bolts and nuts are shown. This dish or disk is secured to and in effect is a part of the valve-casing carrying the diaphragm. The center of the dish or disk is open for the free passage of the fluid to the under side of the diaphragm and also for the stem of the valve, and I have placed within this opening and around the valve-stem a spiral spring, T, which acts on the valve and diaphragm in opposition to the steam. In the case shown the upper end of the spiral spring T bears against a shoulder, $t$, on the dish or disk, while the lower end bears on a nut or collar, N, on the stem of the valve. This collar or nut is threaded onto a threaded portion of the valve-stem, while its periphery is of a polygonal shape, (a hexagon in the case shown,) and the opening in which the nut is placed is of corresponding section, so that the nut cannot turn with the stem, but it can rise or fall with the stem when moved by the diaphragm. In other words, under all adjustments of the valve by means of the hand-wheel to get varying pressures or to entirely close the valve to its seat the collar or nut N does not change its relative position to the shoulder $t$, and the tension of the spring is therefore not changed. If at any time, however, it is desired to change the tension of the spring, the steam or other fluid is cut off, the bottom plug, P, is removed, and the stem screwed down until the thread $s$ is freed from the thread of the stuffing-box, when the stem of the valve can drop without turning until the collar or nut N is freed from the opening in the dish or casing, so that it can be turned up or down on the stem by a suitable tool and the parts then replaced.

From the foregoing description it will be seen that the pressure of steam or other fluid does not depend on the tension of the spring, but upon the adjustment of the hand-wheel. Thus, if there be a pressure of one hundred pounds in the boiler, and it is desired to have, say, ten pounds pressure in the distribution-pipes, the hand-wheel is turned to a certain position, which may be determined by a pressure-gage or by suitable graduation-marks upon the valve-stem, for instance. The pressure in the distribution-pipes will be maintained at ten pounds under this adjustment, notwithstanding any variations in the supply-pressure from the boiler or other source. If the supply-pressure increases, for instance, the consequent increased pressure upon the diaphragm would tend to close the valve and restrict the size of the opening at the valve-seat. On the other hand, if the supply-pressure decreases, the diminished pressure upon the diaphragm will allow the valve to open correspondingly. At any time the pressure in the distributing-pipes can be increased or diminished simply by turning the hand-wheel to adjust the valve in relation to the diaphragm. By screwing the valve-stem far enough upward the valve may be closed tightly to its seat and remain closed to entirely cut off the flow of fluid.

With a spiral spring around the stem of the valve, as described, there is less liability of the valve getting out of center and "chattering" under steam-pressure than if plate-springs were used.

I claim as my invention—

1. The combination of a regulating valve and casing carrying a diaphragm open to the fluid-pressure, with a valve-stem passing through and adjustable in the diaphragm, and a spiral spring around the valve stem, and an adjustable handle for the valve outside the diaphragm.

2. The combination of a regulating valve and casing carrying a diaphragm open to the fluid-pressure, with a threaded stuffing-box connected to the diaphragm, a spiral spring around the valve-stem to oppose the fluid-pressure, and a threaded valve-stem passing through the stuffing-box and having an operating-handle.

3. The combination of a regulating valve and casing carrying a diaphragm open to the fluid-pressure, with a threaded stuffing-box connected to the diaphragm, a threaded valve-stem adapted to the said stuffing-box, and a spiral spring around the valve-stem to oppose the pressure on the diaphragm.

4. The combination of a regulating valve and casing carrying a diaphragm open to the fluid-pressure, with a threaded valve-stem passing through and adjustable in the diaphragm, and a spring to oppose the fluid-pressure on the diaphragm and bearing on a nut or collar not free to turn with the stem, but free to move longitudinally therewith, all substantially as described.

In testimony whereof I have signed my name to this specification in the presence of two subscribing witnesses.

J. M. FOSTER.

Witnesses:
ALBERT BUSCHER,
JOHN REVELL.